US012344782B2

(12) United States Patent
Zhao et al.

(10) Patent No.: US 12,344,782 B2
(45) Date of Patent: Jul. 1, 2025

(54) QUANTUM DOT (QD) AND QD COMPOSITE, AND PREPARATION METHODS THEREOF

(71) Applicants: Beijing Beida Jubang Science & Technology Co., Ltd, Beijing (CN); Weixian Jubang New Material Sci & Tech Co., Ltd, Hebei (CN)

(72) Inventors: Zhiqiang Zhao, Beijing (CN); Xiaobin Gao, Beijing (CN); Baiyu Zhao, Beijing (CN); Dehe Yin, Beijing (CN)

(73) Assignees: BeijingBeida Jubang Science & Technology Co., Ltd, Beijing (CN); Weixian Jubang New Material Sei & Tech Co., Ltd, Hebei (CN)

( * ) Notice: Subject to any disclaimer, the term of this patent is extended or adjusted under 35 U.S.C. 154(b) by 428 days.

(21) Appl. No.: 17/941,968

(22) Filed: Sep. 9, 2022

(65) Prior Publication Data

US 2023/0303916 A1    Sep. 28, 2023

(30) Foreign Application Priority Data

Mar. 28, 2022   (CN) .......................... 202210308705.4

(51) Int. Cl.
C09K 11/02     (2006.01)
B82Y 20/00     (2011.01)
B82Y 40/00     (2011.01)
C09K 11/88     (2006.01)

(52) U.S. Cl.
CPC .......... C09K 11/025 (2013.01); C09K 11/883 (2013.01); *B82Y 20/00* (2013.01); *B82Y 40/00* (2013.01)

(58) Field of Classification Search
CPC ........................... C09K 11/883; C09K 11/025
See application file for complete search history.

(56) References Cited

U.S. PATENT DOCUMENTS

2018/0148638 A1*   5/2018   Ahn ..................... C09K 11/025

\* cited by examiner

*Primary Examiner* — C Melissa Koslow
(74) *Attorney, Agent, or Firm* — Stephen Y. Liu; Carstens, Allen & Gourley, LLP

(57) ABSTRACT

The present disclosure discloses a quantum dot (QD). The QD has a core-shell structure, and specifically has a structure of CdZnSeS/CdZnSe/CdZnS/ZnS, where there is a metal halide ligand between a CdZnS shell and a ZnS shell and outside the ZnS shell. The present disclosure also discloses a preparation method of the QD and a QD composite material prepared from the QD. The QD disclosed by the present disclosure has a small full width at half maxima (FWHM), excellent optical performance, and high stability. In the preparation method of the QD, an intermediate shell layer is prepared through alternate growth of anions and cations, and in addition to the introduction of a metal halide precursor, a long-chain alkanol is added to a shell to further improve the stability.

6 Claims, 5 Drawing Sheets

US 12,344,782 B2

QUANTUM DOT (QD) AND QD COMPOSITE, AND PREPARATION METHODS THEREOF

CROSS REFERENCE TO RELATED APPLICATION

This patent application claims the benefit and priority of Chinese Patent Application No. 202210308705.4, filed on Mar. 28, 2022, the disclosure of which is incorporated by reference herein in its entirety as part of the present application.

TECHNICAL FIELD

The present disclosure relates to the field of preparation of nano-semiconductor materials, and in particular to a quantum dot (QD) and a QD composite, and preparation methods thereof.

BACKGROUND ART

QDs are nanocrystals, and have a particle size generally of 2 nm to 20 nm, which is about one hundred thousandth of a particle size of human hair. QDs can be excited by light, electricity, and the like to emit light, and an emission wavelength can be adjusted by changing a size of the QDs to enable a continuously distributed emission spectrum. Due to their remarkable quantum effects and narrow peak widths, QDs have promising application prospects in the fields of solar cells, display devices, lighting, and biomarkers.

In the field of display, QD materials are more and more widely used because of their excellent optical performance, and currently, QD fluorescent films are most maturely used. A QD fluorescent film has a sandwich structure in which a QD adhesive layer is arranged between two water and oxygen-barrier films, which makes a cost of the barrier films account for a large proportion in a cost of the QD fluorescent film. Thus, increasing companies have paid attention to low-cost QD diffuser plates. Materials for preparing QD diffuser plates generally include polymethyl methacrylate (PMMA), styrene-methyl methacrylate (MS), a polyolefin (PO) resin, polystyrene (PS), polycarbonate (PC), a cyclic olefin copolymer (COC), and the like. Generally, a corresponding masterbatch is melted at a high temperature and then extruded into a plate, which determines that QDs need to have specified tolerance in a high-temperature environment.

In the prior art, in order to overcome the problem that QD diffuser plates have insufficient stability, a barrier adhesive layer is usually applied to a surface of a diffuser plate, or protective outer layers are fabricated from a material with prominent water and oxygen barrier properties through three-layer co-extrusion, which increases preparation procedures for diffuser plates and makes it difficult to obtain high-concentration QD diffuser plates with high stability.

SUMMARY

Therefore, the technical problem to be solved by the present disclosure is to provide a QD and QD composite and preparation methods thereof in view of the defects that the QD diffuser plates in the prior art have insufficient stability and need to be fabricated through a complicated process. In the present disclosure, the stability of a diffuser plate is improved by improving the stability of QDs themselves and wrapping QDs.

The present disclosure adopts the following technical solutions:

The present disclosure provides a QD,
- the QD has a core-shell structure, and specifically has a structure of CdZnSeS/CdZnSe/CdZnS/ZnS;
- there is a metal halide ligand between a CdZnS shell and a ZnS shell and outside the ZnS shell; and
- the QD has an emission wavelength of 450 nm to 650 nm, a full width at half maxima (FWHM) of less than or equal to 25 nm, and a relative quantum yield (PLQY) of greater than 90%.

The present disclosure also provides a preparation method of the QD, including the following steps:
- S1: injecting a first anion precursor into a first cation precursor including zinc and cadmium to obtain a first reaction solution;
- S2: alternately adding a second cation precursor and a second anion precursor to the first reaction solution to allow a reaction to obtain a second reaction solution;
- S3: alternately adding the second cation precursor and a third anion precursor to the second reaction solution to allow a reaction, and adding a solution of a metal halide in alkylphosphine to further allow a reaction to obtain a third reaction solution;
- S4: adding a third cation precursor and a fourth anion precursor to the third reaction solution to allow a reaction, adding a solution of a metal halide in alkylphosphine to allow a reaction, and adding a long chain alkanol to further allow a reaction to obtain a fourth reaction solution; and
- S5: subjecting the fourth reaction solution to solid-liquid separation (SLS) obtain a precipitate, and washing and drying the precipitate to obtain the QD.

Further,
- the first cation precursor may be obtained by mixing a cadmium source, a zinc source, a fatty acid, and an octadecene (ODE) and heating a resulting mixture to 140° C. to 350° C., where an amount ratio of cadmium to zinc may be 1:(1-30);
- the first anion precursor may be obtained by mixing a VI group element and akylphosphine, where the VI group element may be a mixture of sulfur and selenium and an amount ratio of the sulfur to the selenium may be 1:(0.06-15); and
- a ratio of a total amount of the sulfur and the selenium in the first anion precursor to a total amount of the cadmium and the zinc in the first cation precursor may be 1:(1-30).

The second cation precursor may be obtained by mixing a cadmium source, a zinc source, a fatty acid, and an ODE and heating a resulting mixture to 100° C. to 300° C., where an amount ratio of cadmium to zinc may be 1:(0.2-50);
- the second anion precursor may be obtained by mixing selenium and alkylphosphine;
- the third anion precursor may be obtained by mixing sulfur and alkylphosphine;
- a ratio of an amount of the selenium in the second anion precursor to a total amount of the cadmium and the zinc in the second cation precursor may be 1:(0.05-30); and
- a ratio of an amount of the sulfur in the third anion precursor to the total amount of the cadmium and the zinc in the second cation precursor may be 1:(0.05-30).

The third cation precursor may be obtained by mixing a zinc source, a fatty acid, and an ODE and heating a resulting mixture to 100° C. to 300° C.;
- the fourth anion precursor may be obtained by mixing a sulfur source with alkylphosphine or an ODE or a fatty acid, and may have a sulfur concentration of 0.1 mmol/mL to 10 mmol/mL;

a ratio of an amount of sulfur in the fourth anion precursor to an amount of zinc in the third cation precursor may be 1:(0.05-30); and the solution of a metal halide in alkylphosphine may have a metal halide concentration of 0.01 mmol/mL to 5 mmol/mL.

Preferably, the total amount of the cadmium and the zinc in the first cation precursor, the total amount of the cadmium and the zinc in the second cation precursor, and the amount of the zinc in the third cation precursor may be in a ratio of 1:1:0.5.

Further preferably, the fatty acid may be one or more selected from the group consisting of oleic acid, stearic acid, dodecanoic acid, tetradecanoic acid, and hexadecanoic acid;

the alkylphosphine may be tributylphosphine (TBP) or trioctylphosphine (TOP);

the cadmium source may be one or more selected from the group consisting of cadmium oxide, cadmium acetate, and cadmium stearate;

the zinc source may be one or more selected from the group consisting of zinc oxide, zinc acetate, and zinc stearate;

the metal halide may be one selected from the group consisting of aluminum chloride, zinc chloride, magnesium chloride, cupric chloride, aluminum bromide, zinc bromide, magnesium bromide, cupric bromide, zinc iodide, and cuprous iodide;

the sulfur source may be one selected from the group consisting of a sulfur powder, dodecariethiol (DDT), and octanethiol; and the long-chain aikanol may be one selected from the group consisting of n-octanol, n-decanol, and dodecanol.

The present disclosure also provides a QD composite prepared from the QD described above.

The present disclosure also provides a preparation method of the QD composite, including the following steps:

dissolving each of the QD and an organic polymer in xylene to obtain two solutions, and mixing the two solutions to obtain a mixed solution, where a mass ratio of the QD to the organic polymer is 1:(1-20); and adding an antioxidant to the mixed solution to allow a reaction, and after the reaction is completed, removing the solvent, and drying and crushing a resulting solid to obtain the QD composite.

Further, the organic polymer may be one or more selected from the group consisting of an acrylic polymer, a cyclic olefin copolymer (COC), PS, and a styrene copolymer, and may have a molecular weight of 4,000 to 90,000; and the antioxidant is one or more selected from the group consisting of pentaerythritol tetrakis[β-(3,5-di-tert-butyl-4-hydroxyphenyl)propanoate], tris(2,4-di-tert-butylphenyl)phosphite, and bis(2,4-di-tert-butylphenyl)pentaerythritol diphosphite.

Compared with the QD material, the above QD composite has significantly-improved high-temperature stability, and basically-unchanged optical performance.

In addition, the present disclosure also provides a QD color masterbatch including the QD composite described above.

In the QD color masterbatch, a weight percentage of the QD composite is 1 wt % to 5 wt %, a weight percentage of an antioxidant is 0.5 wt % to 5 wt %, a weight percentage of a diffusing particle is 5 wt % to 20 wt %, and a resin accounts for the balance.

The QD material can be adjusted to obtain QD composites of different colors. A green masterbatch is prepared from a green QD composite, and a red masterbatch is prepared from a red QD composite.

The resin may be one or a mixture of two or more selected from the group consisting of PMMA, MS, a PO resin, PS, PC, and COC.

The antioxidant may be a common antioxidant on the market, including one or more selected from the group consisting of pentaerythritol tetrakis[β-(3,5-di-tert-butyl-4-hydroxyphenyl)propanoate], tris(2,4-di-tert-butylphenyl)phosphite, and bis(2,4-di-tert-butylphenyl)pentaerythritol diphosphite.

The diffusing particle may be one or more selected from the group consisting of silicon dioxide, titanium dioxide, zinc oxide, and zirconium oxide.

The present disclosure also provides a QD diffuser plate. The QD diffuser plate is fabricated as follows: mixing a QD red masterbatch and a QD green masterbatch in a ratio of 1:(2-10) and subjecting a resulting mixture to co-extrusion, where a resin can be added accordingly to obtain diffuser plates with different concentrations.

The technical solutions of the present disclosure have the following advantages:

(1) The QD provided by the present disclosure adopts a core-shell structure, has a small FWHM, and exhibits excellent optical performance, and a ligand between shell layers can significantly improve the stability of the QD.

(2) In the preparation method of the QD provided by the present disclosure, a metal halide precursor is added between an intermediate shell layer and an outer shell layer of the QD and outside the outer shell layer of the QD, and the metal halide serves as a Lewis acid. The metal halide is attached to an uncoordinated anion surface to bind to a surface of the QD in the form of a Z-type ligand on the one hand, and releases highly-electronegative halide ions to bind to a surface of the QD in the form of an X-type ligand on the other hand, which greatly reduces the surface defects between the core and shell of the QD and between the shell layers and improves the stability of the QD. A long-chain alkanol is further added to the outer shell layer for additional passivation of non-coordinating surface bonds, which further enhances the stability of the QD.

(3) In the QD composite provided by the present disclosure, an action between the QD and the high-molecular polymer enables a specified distance among QDs, such as to avoid fluorescence quenching caused by agglomeration of QDs in use and significantly improve the heat resistance of the QD.

(4) The QD composite provided by the present disclosure has excellent high-temperature resistance, and in the preparation of a QD color masterbatch and a QD diffuser plate, the optical performance will not be significantly attenuated, and the QD material can be protected in a high-temperature environment to some extent.

(5) Chromaticity coordinates of the QD diffuser plate of the present disclosure can be adjusted arbitrarily based on the ratio of the red masterbatch to the green masterbatch, which can be used for a white backlighting low-concentration diffuser plate and a blue backlighting high-concentration diffuser plate.

BRIEF DESCRIPTION OF THE DRAWINGS

To describe the technical solutions in the specific implementations of the present disclosure or the prior art more clearly, the accompanying drawings required for describing the specific implementations or the prior art are briefly described below. Apparently, the accompanying drawings in the following description show merely some implementations of the present disclosure, and a person of ordinary skill in the art may still derive other accompanying drawings from these accompanying drawings without creative efforts.

DETAILED DESCRIPTION OF THE EMBODIMENTS

Figure 1:
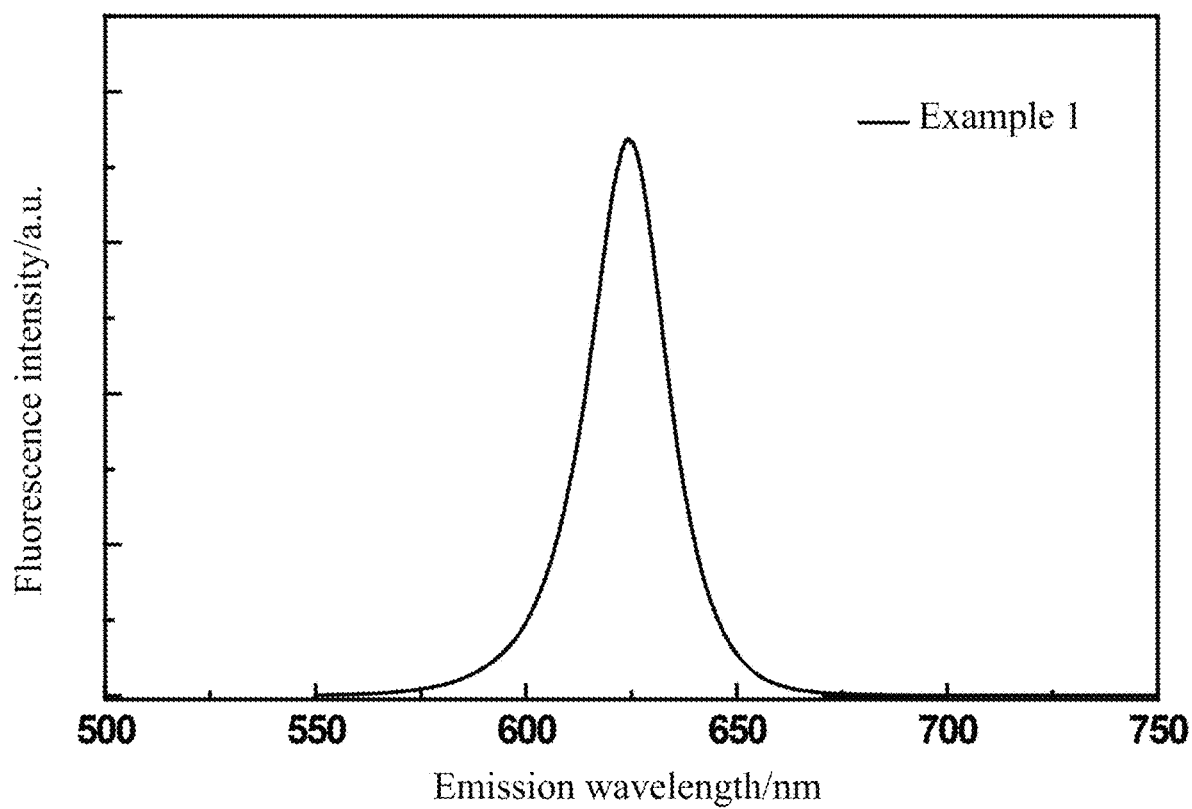
FIG. 1 shows a fluorescence emission spectrum of the QD obtained in Example 1 of the present disclosure.

The present disclosure can be further well understood through the following examples, but is not limited to the preferred implementations. The examples do not limit the content and protection scope of the present disclosure. Any product that is the same as or similar to the product of the present disclosure and is obtained in light of the present disclosure or by combining the present disclosure with other features of the prior art shall fall within the protection scope of the present disclosure.

If specific experimental steps or conditions are not indicated in the examples, operations or conditions of the conventional experimental steps described in the literatures in the art may be adopted. All of the used reagents or instruments which are not specified with manufacturers are conventional commercially-available reagents or instruments.

In the examples and comparative examples of the present disclosure, the PMMA used is a commercially-available product with a molecular weight of 15,000; and the antioxidant used is a commercially-available product such as an antioxidant 1010 (pentaerythritol tetrakis[β-(3,5-di-tert-butyl-4-hydroxyphenyl)propanoate]) and an antioxidant 168 (tris(2,4-di-tert-butylphenyl)phosphite).

Unless otherwise stated, the terms of "tributylphosphine" and "TBP", "octadecene" and "ODE", or "dodecanethiol" and "DDT" mentioned herein are regarded as equivalent.

The following specific examples provides the further description of the present disclosure, the listed examples cannot represent all implementations of the present disclosure, and only some of the implementations of the present disclosure are illustrated as examples. Specific examples are as follows:

A first anion precursor, a second anion precursor, a third anion precursor, a fourth anion precursor, a second cation precursor, a third cation precursor, and a solution of a metal halide in alkylphosphine used in each of the examples and comparative examples are prepared in advance.

Preparation of a First Anion Precursor TBP-Se—S Solution:

80 mmol of a sulfur powder and 80 mmol of a selenium powder are each weighed and added to a conical flask, then 80 mL of TBP is added, and a resulting mixture is subjected to ultrasonic vibration to obtain a first anion precursor with a sulfur-selenium concentration of 2 mmol/mL, in which a ratio of sulfur to selenium is 1:1.

A first anion precursor with a concentration of 2 mmol/mL in which a ratio of sulfur to selenium is 1:9 is prepared in the same way as above.

Preparation of a Second Anion Precursor TBP-Se Solution:

240 mmol of a selenium powder is weighed and added to a conical flask, then 120 mL of TBP is added, and a resulting mixture is subjected to ultrasonic vibration to obtain a second anion precursor with a selenium concentration of 2 mmol/mL.

Preparation of a Third Anion Precursor TBP-S Solution:

240 mmol of a sulfur powder is weighed and added to a conical flask, then 120 mL of TBP is added, and a resulting mixture is subjected to ultrasonic vibration to obtain a third anion precursor with a sulfur concentration of 2 mmol/mL.

Preparation of a Fourth Anion Precursor DDT-ODE Solution:

175 mL of DDT and 125 mL of ODE are each taken and thoroughly mixed to obtain a fourth anion precursor with a sulfur concentration of 2.4 mmol/mL.

Preparation of a Second Cation Precursor:

180 mmol of zinc oxide and 36 mmol of cadmium oxide are each weighed and added to a three-necked flask, 288 mL of oleic acid and 576 mL of ODE are added, a resulting system is vacuumed and heated to 150° C. until a clear solution is obtained, and nitrogen is introduced for protection to obtain a second cation precursor with a cation concentration of 0.25 mmol/mL.

Preparation of a Third Cation Precursor:

180 mmol of zinc oxide is weighed and added to a three-necked flask, 240 mL of oleic acid and 480 mL of ODE are added, a resulting system is vacuumed and heated to 150° C. until a clear solution is obtained, and nitrogen is introduced for protection to obtain a third cation precursor with a cation concentration of 0.25 mmol/mL.

Preparation of the Solution of a Metal Halide in Alkylphosphine:

Preparation of a solution of aluminum chloride in TBP with a concentration of 0.5 mmol/mL:

20 mmol of an aluminum chloride solid powder is weighed and added to a conical flask, then 40 mL of TBP is added, and a resulting mixture is subjected to ultrasonic vibration to obtain the solution of aluminum chloride in TBP with a concentration of 0.5 mmol/mL.

Preparation of a Solution of Zinc Chloride in TBP with a Concentration of 0.5 Mmol/mL:

20 mmol of a zinc chloride solid powder is weighed and added to a conical flask, then 40 mL of TBP is added, and a resulting mixture is subjected to ultrasonic vibration to obtain the solution of zinc chloride in TBP with a concentration of 0.5 mmol/mL.

Example 1

In this example, a preparation method of a QD was provided, specifically including the following steps:

1) Preparation of a QD Core CdZnSeS:

20 mmol of cadmium oxide and 80 mmol of zinc oxide were each weighed and added to a 2 L three-necked flask, then 135 mL of oleic acid and 250 mL of ODE, were added, a resulting system was vacuumed and heated to 150° C. until a clear solution was obtained, and nitrogen was introduced to obtain a first cation precursor; and under the protection of nitrogen, the first cation precursor was heated to 310° C., then 12 mL of a first anion precursor TBP-Se—S with a concentration of 2 mmol/mL in which a ratio of selenium to sulfur was 9:1 was rapidly added, and a resulting mixture was stirred to allow a reaction for 10 min.

2) Wrapping With a QD Shell CdZnSe:

48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.

3) Wrapping With a QD Shell CdZnS:

The same reaction as above was repeated, except that the 24 mL of the second anion precursor TBP-Se with a concentration of 2 mmol/mL was replaced by 24 mL of a third anion precursor TBP-S with a concentration of 2 mmol/mL; the anion and cation precursors were alternately added four times and then 40 mL of a solution of aluminum chloride in TBP with a concentration of 0.5 mmol/mL was added to allow a reaction for 30 min.

4) Wrapping With a QD Shell ZnS:

198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 40 mL of a solution of aluminum chloride in TBP with a concentration of 0.5 mmol/mL was added to allow a reaction for 30 min, and a resulting system was cooled to 230° C.; and 36 mL of n-octanol was added to allow a reaction for 30 min, and a resulting system was cooled to room temperature.

5) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD. A fluorescence emission spectrum of the QD was shown in FIG. 1.

In this example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Example 2

In this example, a preparation method of a QD was provided, specifically including the following steps:

1) Preparation of a QD Core CdZnSeS:

3.5 mmol of cadmium acetate and 80 mmol of zinc oxide were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.

2) Wrapping With a QD Shell CdZnSe:

48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.

3) Wrapping With a QD Shell CdZnS:

The same reaction as above was repeated, except that the 24 mL of the second anion precursor TBP-Se with a concentration of 2 mmol/mL was replaced by 24 mL of a third anion precursor TBP-S with a concentration of 2 mmol/mL; the anion and cation precursors were alternately added four times; and then 40 mL of a solution of aluminum chloride in TBP with a concentration of 0.5 mmol/mL was added to allow a reaction for 30 min.

4) Wrapping With a QD Shell ZnS:

198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 40 mL of a solution of aluminum chloride in TBP with a concentration of 0.5 mmol/mL was added to allow a reaction for 30 min, and a resulting system was cooled to 230° C.; and 36 mL of n-octanol was added to allow a reaction for 30 min, and a resulting system was cooled to room temperature.

Figure 2:
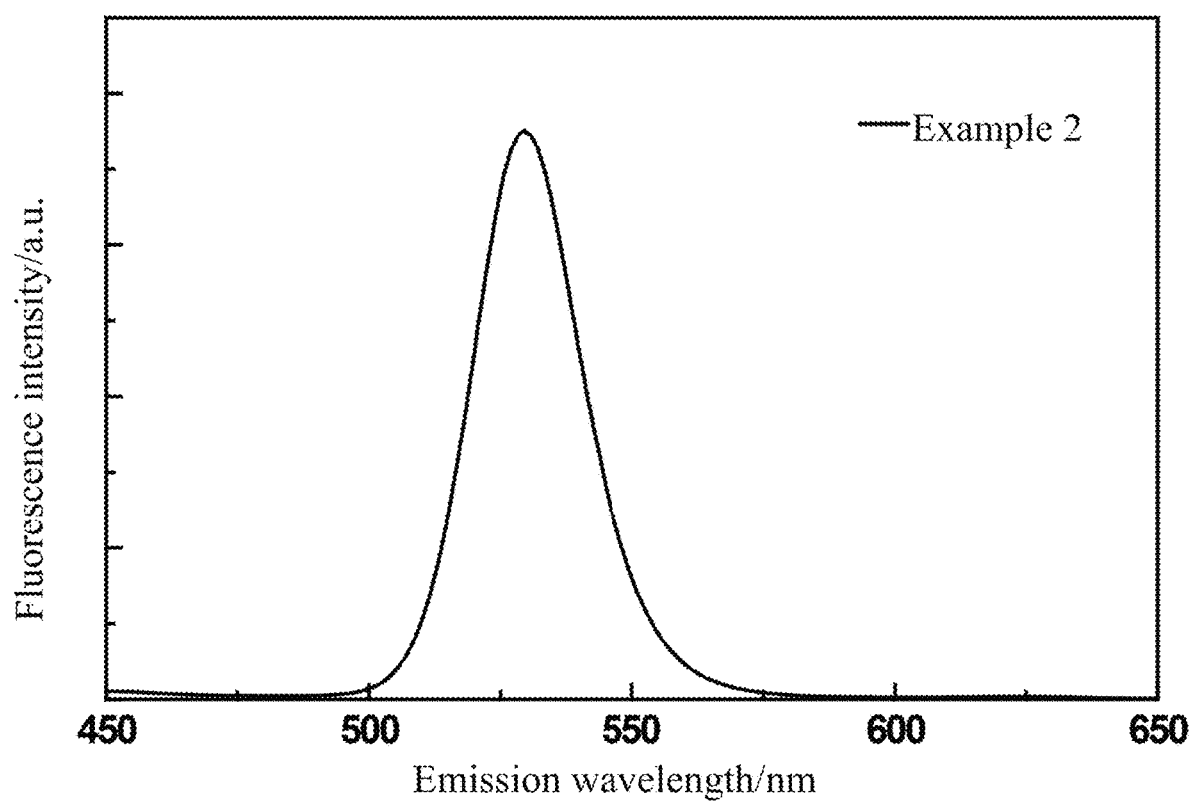
FIG. 2 shows a fluorescence emission spectrum of the QD obtained in Example 2 of the present disclosure.

5) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD. A fluorescence emission spectrum of the QD was shown in FIG. 2.

In this example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Example 3

In this example, a preparation method of a QD was provided, specifically including the following steps:
1) Preparation of a QD Core CdZnSeS:
3.5 mmol of cadmium acetate and 80 mmol of zinc stearate were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 18 mL of a first anion precursor TBP-Se—S with a concentration of 2 mmol/mL in which a ratio of selenium to sulfur was 1:1 was rapidly added, and a resulting mixture was stirred to allow a reaction for 10 min.
2) Wrapping With a QD Shell CdZnSe:
48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.
3) Wrapping With a QD Shell CdZnS:
The same reaction as above was repeated, except that the 24 mL of the second anion precursor TBP-Se with a concentration of 2 mmol/mL was replaced by 24 mL of a third anion precursor TBP-S with a concentration of 2 mmol/mL; the anion and cation precursors were alternately added four times; and then 30 mL of a solution of zinc chloride in TBP with a concentration of 0.5 mmol/mL was added to allow a reaction for 30 min.
4) Wrapping With a QD Shell ZnS:
198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 30 mL of a solution of zinc chloride in TBP with a concentration of 0.5 mmol/mL was added to allow a reaction for 30 min, and a resulting system was cooled to 230° C.; and 36 mL of n-decanol was added to allow a reaction for 30 min, and a resulting system was cooled to room temperature.
5) Precipitation and Drying:
An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

Example 4

In this example, a preparation method of a QD was provided, specifically including the following steps:
1) Preparation of a QD Core CdZnSeS:
3.5 mmol of cadmium oxide and 80 mmol of zinc dodecanoate were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 10 mL of a first anion precursor TBP-Se—S with a concentration of 2 mmol/mL in which a ratio of selenium to sulfur was 1:1 was rapidly added, and a resulting mixture was stirred to allow a reaction for 10 min.
2) Wrapping With a QD Shell CdZnSe:
48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.
3) Wrapping With a QD Shell CdZnS:
The same reaction as above was repeated, except that the 24 mL of the second anion precursor TBP-Se with a concentration of 2 mmol/mL was replaced by 24 mL of a third anion precursor TBP-S with a concentration of 2 mmol/mL; the anion and cation precursors were alternately added four times; and then 50 mL of a solution of zinc chloride in TBP with a concentration of 0.5 mmol/mL was added to allow a reaction for 30 min.
4) Wrapping With a QD Shell ZnS:
198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 50 mL of a solution of zinc chloride in TBP with a concentration of 0.5 mmol/mL was added to allow a reaction for 30 min, and a resulting system was cooled to 230° C.; and 36 mL of n-decanol was added to allow a reaction for 30 min, and a resulting system was cooled to room temperature.
5) Precipitation and Drying:
An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

Comparative Example 1

In this comparative example, a preparation method of a QD was provided, specifically including the following steps:
1) Preparation of a QD Core CdZnSeS:
3.5 mmol of cadmium acetate and 80 mmol of zinc oxide were each weighed and added to a 2 L three-necked flask, then 135 ml of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.
2) Wrapping With a QD Shell CdZnSe:
48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.

3) Wrapping With a QD Shell CdZnS:

The same reaction as above was repeated, except that the 24 mL of the second anion precursor TBP-Se with a concentration of 2 mmol/mL was replaced by 24 mL of a third anion precursor TBP-S with a concentration of 2 mmol/mL; and the anion and cation precursors were alternately added four times.

4) Wrapping With a QD Shell ZnS:

198 of a third cation precursor was added to the above QD solution, 142 mL of a fourth anion precursor with a concentration of 2.4 mmol/mL was slowly added dropwise at a rate of 71 mL/h to further allow a reaction for 30 min, and a resulting system was cooled to room temperature.

5) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

In this comparative example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Comparative Example 2

In this comparative example, a preparation method of a QD was provided, specifically including the following steps:

1) Preparation of a QD Core CdZnSeS:

3.5 mmol of cadmium acetate and 80 mmol of zinc oxide were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.

2) Wrapping with a QD Shell CdZnSe:

48 mL of a second cation precursor was added to the above solution, 24 mL of a second anion precursor TBP-Se with a concentration of 2 mmol/mL was slowly added dropwise at a rate of 48 mL/h, 48 mL of the second cation precursor was added once again, and the same amount of the second anion precursor TBP-Se was added dropwise at the same rate once again. The anion and cation precursors were added alternately four times.

3) Wrapping With a QD Shell CdZnS:

The same reaction as above was repeated, except that the 24 mL of the second anion precursor TBP-Se with a concentration of 2 mmol/mL was replaced by 24 mL of a third anion precursor TBP-S with a concentration of 2 mmol/mL; and the anion and cation precursors were alternately added four times.

4) Wrapping With a QD Shell ZnS:

198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 40 mL of a solution of aluminum chloride in TBP with a concentration of 0.5 mmol/mL was added to allow a reaction for 30 min, and a resulting system was cooled to 230° C.; and 36 mL of n-octanol was added to allow a reaction for 30 min, and a resulting system was cooled to room temperature.

5) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

In this comparative example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Comparative Example 3

In this comparative example, a preparation method of a OD was provided, specifically including the following steps:

1) Preparation of a QD Core CdZnSe:

3.5 mmol of cadmium oxide and 80 mmol of zinc oxide were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.

2) Wrapping With a QD Shell ZnS:

198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; 40 mL of a solution of aluminum chloride in TBP with a concentration of 0.5 mmol/mL was added to allow a reaction for 30 min, and a resulting system was cooled to 230° C.; and 36 mL of n-octanol was added to allow a reaction for 30 min, and a resulting system was cooled to room temperature.

3) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

In this comparative example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD was dissolved in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Comparative Example 4

In this comparative example, a preparation method of a QD was provided, specifically including the following steps:

1) Preparation of a QD Core CdZnSe:

3.5 mmol of cadmium oxide and 80 mmol of zinc oxide were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.

2) Wrapping With a QD Shell ZnS:

198 mL of a third cation precursor was added to the above QD solution, and 142 mL of a fourth anion precursor with a concentration of 2.4 mmol/mL was slowly added dropwise at a rate of 71 mL/h to further allow a reaction for 30 min; and 40 mL of a solution of aluminum chloride in TBP with a concentration of 0.5 mmol/mL was added to allow a reaction for 30 min, and a resulting system was cooled to room temperature.

In this comparative example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Comparative Example 5

In this comparative example, a preparation method of a QD was provided, specifically including the following steps:

1) Preparation of a QD Core CdZnSe:

3.5 mmol of cadmium oxide and 80 mmol of zinc oxide were each weighed and added to a 2 L three-necked flask, then 135 mL of oleic acid and 250 mL of ODE were added, a resulting system was vacuumed and heated to 150° C. until a clear solution was obtained, and nitrogen was introduced to obtain a first cation precursor; and under the protection of nitrogen, the first cation precursor was heated to 310° C., then 15 mL of a first anion precursor TBP-Se—S with a concentration of 2 mmol/mL in which a ratio of selenium to sulfur was 1:1 was rapidly added, and a resulting mixture was stirred to allow a reaction for 10 min.

2) Wrapping With a QD Shell ZnS:

198 mL of a third cation precursor was added to the above QD solution, 142 mL of a fourth anion precursor with a concentration of 2.4 mmol/mL was slowly added dropwise at a rate of 71 mL/h to further allow a reaction for 30 min, and a resulting system was cooled to room temperature.

3) Precipitation and Drying:

An equal volume of n-hexane and an equal volume of absolute ethanol were added to the solution obtained above, and a resulting mixture was allowed to stand such that a flocculent precipitate was generated, and then centrifuged; a resulting supernatant was removed to obtain a precipitate, the precipitate was dissolved in n-hexane, and ethanol was added; and a resulting mixture was centrifuged to obtain a precipitate, and the precipitate was dried in a vacuum drying oven to obtain the QD.

In this comparative example, a preparation method of a QD composite was also provided, specifically including the following steps:

40 g of PMMA was weighed and added to a three-necked flask, 800 g of xylene was added, and a resulting mixture was stirred; vacuuming was conducted at room temperature for 10 min, then nitrogen was introduced, and the mixture was heated to 100° C. and further stirred until the PMMA was completely dissolved; the prepared QD was crushed and then dissolved in xylene at a concentration of 25 wt %, and 100 g of a solution of the QD in xylene was added dropwise to the above PMMA solution; a resulting mixture was stirred at 100° C. for 72 h, 0.8 g of an antioxidant 1010 was added, 0.2 g of an antioxidant 168 was added, and a resulting mixture was further stirred for 1 h; and the xylene was removed and collected through vacuum distillation, and a product obtained after the vacuum distillation was dried in a vacuum drying oven and crushed to obtain the QD composite.

Test Example 1

The QDs obtained in Examples 1 to 4 and Comparative Examples 1 to 5 and the QD composites obtained in Examples 1 and 2 and Comparative Examples 1 to 5 were each subjected to optical performance tests.

The optical performance tests were conducted by a relative method according to the national standards GB/T 36081-2018, GB/24370-2009, and GB/T37664.1-2019 to determine a fluorescence emission peak, an FWHM, and a relative PLQY. A fluorescence spectrophotometer was used to determine a fluorescence spectrum of a QD at a corresponding excitation wavelength, where the highest peak represented an emission wavelength, a half width of the highest peak represented an FWHM, and an integral area was read out and recorded.

A PLQY was calculated according to the following formula, $$QY_s = \frac{A_o \times F_o}{A_s \times F_o} \times \frac{n_o^2}{(n_o)} \times QY_o$$

where
$QY_o$ represents a PLQY of a fluorescence standard substance;
$A_o$ represents an absorbance of a fluorescence standard substance at an excitation wavelength;
$A_s$ represents an absorbance of a test sample at an excitation wavelength;
$n_o$ represents a refractive index of a solvent for a fluorescence standard substance;
$n_s$ represents a refractive index of a solvent for a test sample;
$F_o$ represents an integral area of a fluorescence peak of a fluorescence standard substance; and
$F_s$ represents an integral area of a fluorescence peak of a test sample.

The optical performance test data were shown in Table 1 below:

TABLE 1

Optical performance and changes of QDs and QD composites

| Example | Material | Em | FWHM | QY | Em shift | QY change |
|---|---|---|---|---|---|---|
| Example 1 | QD | 626.1 nm | 21 nm | 95% | +0.5 nm | −2.1% |
|  | Composite | 626.6 nm | 21 nm | 93% |  |  |
| Example 2 | QD | 531.8 nm | 22 nm | 97% | +0.6 nm | −2.06% |
|  | Composite | 532.4 nm | 22 nm | 95% |  |  |
| Example 3 | QD | 518.1 nm | 21 nm | 98% | / | / |
| Example 4 | QD | 549.1 nm | 23 nm | 94% | / | / |
| Comparative Example 1 | QD | 531.6 nm | 22 nm | 96% | +0.5 nm | −4.17% |
|  | Composite | 532.1 nm | 22 nm | 92% |  |  |
| Comparative Example 2 | QD | 531.8 nm | 22 nm | 96% | +0.5 nm | −2.5% |
|  | Composite | 532.3 nm | 22 nm | 94% |  |  |
| Comparative Example 3 | QD | 535.4 nm | 27 nm | 95% | +0.5 nm | −3.1% |
|  | Composite | 535.9 nm | 27 nm | 93% |  |  |
| Comparative Example 4 | QD | 535.2 nm | 27 nm | 96% | +0.6 nm | −3.5% |
|  | Composite | 535.8 nm | 27 nm | 93% |  |  |
| Comparative Example 5 | QD | 535.1 nm | 27 nm | 94% | +0.7 nm | −5.32% |
|  | Composite | 535.8 nm | 27 nm | 89% |  |  |

It can be seen from the optical performance data of QDs and composites in Table 1 that, after a QD is wrapped, a PLQY of the QD does not decrease heavily, and a light-emitting emission peak shift is small, indicating that QDs are well dispersed in a QD composite.

It can be seen from the comparison results of Example 2 and Comparative Examples 1 to 5 that whether there is an alloy structure shell has an impact on an FWHM of a QD, but has little impact on a PLQY; and the use of a metal halide and a long-chain alkanol has no significant impact on the optical performance of a QD.

Test Example 2

The QDs and QD composites in Examples 1 and 2 and Comparative Examples 1 to 5 were each subjected to a high-temperature aging treatment, which was specifically as follows:

1) 20 mg of a QD or a QD composite was taken and placed in a flat-bottomed quartz cuvette with an inner diameter of 15 mm and a height of 5 mm, and 2 replicates were set for each sample.

2) The above samples were aged. The aging conditions and optical performance results were shown in Tables 2 and 3 below:

TABLE 2

Changes in optical performance of QDs after being subjected to high-temperature aging

| QD | Temperature | Time | Em | FWHM | QY | Em shift | Yield change |
|---|---|---|---|---|---|---|---|
| Example 1 | Room temperature | 0.5 h | 626.1 nm | 21 nm | 95% | +1.8 nm | −20% |
|  | 230° C. | 0.5 h | 627.9 nm | 21.3 nm | 76% |  |  |
| Example 2 | Room temperature | 0.5 h | 531.8 nm | 22 nm | 97% | +1.5 nm | −19.6% |
|  | 230° C. | 0.5 h | 533.3 nm | 22 nm | 78% |  |  |
| Comparative Example 1 | Room temperature | 0.5 h | 531.6 nm | 22 nm | 96% | +2.2 nm | −32.3% |
|  | 230° C. | 0.5 h | 533.8 nm | 22.4 nm | 65% |  |  |
| Comparative Example 2 | Room temperature | 0.5 h | 531.8 nm | 22 nm | 96% | +2.0 nm | −23.9% |
|  | 230° C. | 0.5 h | 533.8 nm | 22.2 nm | 73% |  |  |
| Comparative Example 3 | Room temperature | 0.5 h | 535.4 nm | 27 nm | 95% | +2.1 nm | −26.3% |
|  | 230° C. | 0.5 h | 537.5 nm | 27.3 nm | 70% |  |  |
| Comparative Example 4 | Room temperature | 0.5 h | 535.2 nm | 27 nm | 96% | +2.3 nm | −28.1% |
|  | 230° C. | 0.5 h | 537.5 nm | 27.3 nm | 69% |  |  |

TABLE 2-continued

Changes in optical performance of QDs after being subjected to high-temperature aging

| QD | Temperature | Time | Em | FWHM | QY | Em shift | Yield change |
|---|---|---|---|---|---|---|---|
| Comparative Example 5 | Room temperature | 0.5 h | 535.1 nm | 27 nm | 94% | +2.5 nm | −42.6% |
| | 230° C. | 0.5 h | 537.6 nm | 27.4 nm | 54% | | |

TABLE 3

Changes in optical performance of QD composites after being subjected to high-temperature aging

| Composite | Temperature | Time | Em | FWHM | QY | Em shift | Yield change |
|---|---|---|---|---|---|---|---|
| Example 1 | Room temperature | 0.5 h | 626.6 nm | 21 nm | 93% | +0.3 nm | −2.1% |
| | 230° C. | 0.5 h | 626.9 nm | 21.2 nm | 91% | | |
| Example 2 | Room temperature | 0.5 h | 532.4 nm | 22 nm | 95% | +0.2 nm | −1.9% |
| | 230° C. | 0.5 h | 532.6 nm | 22.1 nm | 93% | | |
| Comparative Example 1 | Room temperature | 0.5 h | 534.1 nm | 22 nm | 92% | +0.9 nm | −15.2% |
| | 230° C. | 0.5 h | 535.0 nm | 22.2 nm | 78% | | |
| Comparative Example 2 | Room temperature | 0.5 h | 532.3 nm | 22 nm | 94% | +0.5 nm | −7.5% |
| | 230° C. | 0.5 h | 532.8 nm | 22 nm | 87% | | |
| Comparative Example 3 | Room temperature | 0.5 h | 535.9 nm | 27 nm | 93% | +0.6 nm | −9.5% |
| | 230° C. | 0.5 h | 536.5 nm | 27.2 nm | 84% | | |
| Comparative Example 4 | Room temperature | 0.5 h | 535.8 nm | 27 nm | 93% | +0.7 nm | −12% |
| | 230° C. | 0.5 h | 536.5 nm | 27.2 nm | 82% | | |
| Comparative Example 5 | Room temperature | 0.5 h | 535.8 nm | 27 nm | 89% | +1.3 nm | −18.5% |
| | 230° C. | 0.5 h | 537.1 nm | 27.2 nm | 73% | | |

A QD composite needs to undergo a high-temperature treatment for a specified period of time when prepared into a QD color masterbatch or a QD diffuser plate, which is a challenge for QDs with a surface rich in organic functional groups. Therefore, it is necessary to test the optical performance of QDs and composites thereof at a high temperature.

It can be seen from the data in Table 2 that, after a QD material is subjected to high-temperature aging, a light-emitting emission peak undergoes a red shift of at least 1.5 nm, and a PLQY attenuation range is close to or even far higher than 20%; in particular, a QD without a treatment of a metal halide and an alkanol undergoes an attenuation range of 42.6% after high-temperature aging; and an attenuation range of a QD treated by one or more selected from the group consisting of an alloy structure, a metal halide, and an alkanol after high-temperature aging is slightly better than an attenuation range of an untreated QD such as Comparative Example 5 after high-temperature aging, but still cannot fully satisfy the requirements of a diffuser plate for the high-temperature resistance of a QD.

It can be seen from the data in Table 3 that wrapping a QD to prepare a QD composite is an excellent way for protection; compared with a QD itself, a QD composite shows significantly improved high-temperature aging resistance; emission peak red shifts of all composites do not exceed 1.5 nm, and PLQY attenuation ranges are greatly reduced; and in particular, the examples with the treatment of a metal halide and an alkanol have an attenuation range of less than or equal to 5%, indicating that the QDs and composites of the present disclosure have prominent high-temperature resistance.

Test Example 3

In this test example, a preparation method of a QD color masterbatch was provided, including the following steps: 20 g of the QD composite prepared in Example 1, 100 g of silicon dioxide, 20 g of nano-titanium dioxide, 16 g of an antioxidant 1010, and 4 g of an antioxidant 168 were thoroughly mixed, then 800 g of PMMA was added, and a resulting mixture was thoroughly mixed and subjected to granulation at 230° C. in a granulator to obtain a QD red masterbatch.

The same method was used to prepare a QD green masterbatch with the QD composite prepared in Example 2.

The obtained red and green QD masterbatch samples were each subjected to a high-temperature aging treatment, which was specifically as follows:

1) A specified amount of a QD color masterbatch was taken and placed in a flat-bottomed quartz cuvette with an inner diameter of 15 mm and a height of 5 mm. 2 replicates were set for each sample, where QD green masterbatch samples were numbered RQC-01 and RQC-02, and QD red masterbatch samples were numbered GQC-01 and GQC-02.

2) The above samples were each subjected to varying degrees of aging tests, and specific aging conditions were shown in Table 2:

TABLE 4

Aging conditions of QD color masterbatch samples

| Sample | Aging temperature | Aging time |
|---|---|---|
| RQC-01 | Room temperature | 0.5 h |
| RQC-02 | 230° C. | 0.5 h |
| GQC-01 | Room temperature | 0.5 h |
| GQC-02 | 230° C. | 0.5 h |

Figure 3:
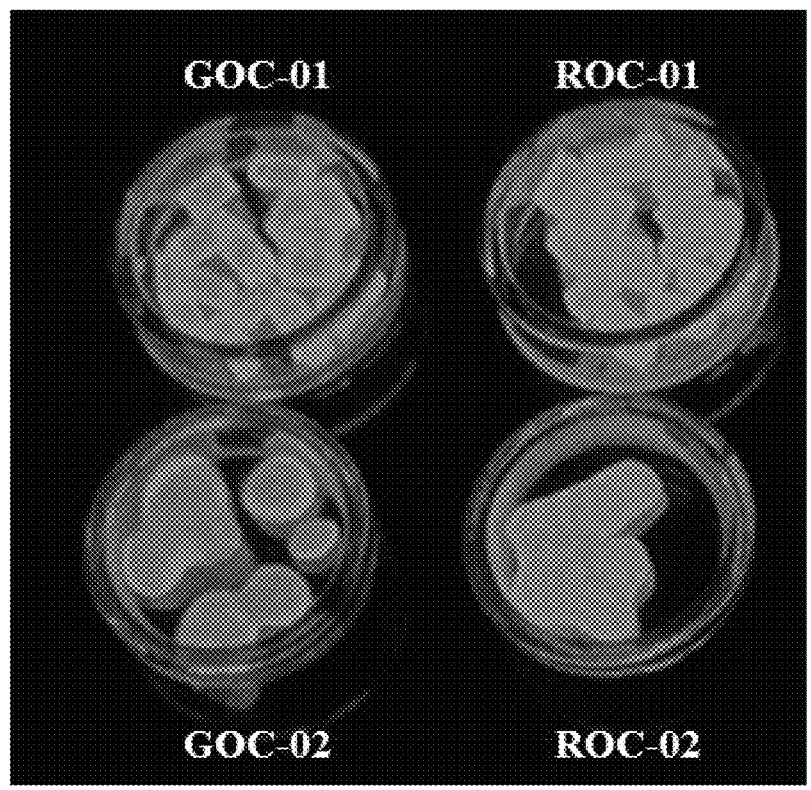
FIG. 3 is a photo of the QD red and green masterbatch samples before and after being aged at 230° C. for half an hour under ultraviolet (UV) light in Test Example 3 of the present disclosure.

As shown in FIG. 3, after being aged at 230° C. for 0.5 h, a QD masterbatch has a melting phenomenon, indicating that a high-molecular polymer can be melted at this temperature, which is conducive to extrusion molding. It can be seen from the comparison of samples before and after aging that, the luminous efficiency of each of the red and green QD masterbatch samples does not decrease significantly, indicating that the QD masterbatch samples maintain prominent high-temperature stability.

Test Example 4

Figure 4:
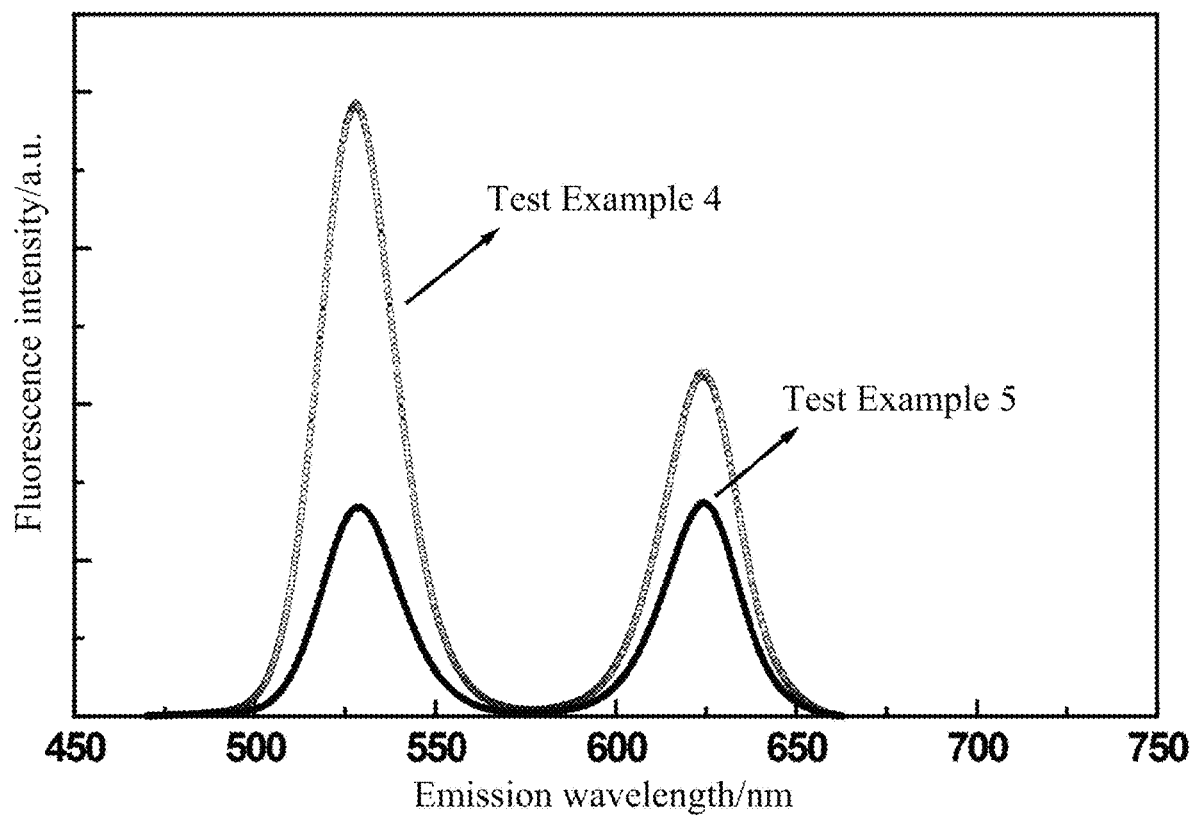
FIG. 4 shows fluorescence spectra of the QD diffuser plates obtained in Test Examples 4 and 5 of the present disclosure under a fluorescence spectrophotometer at an excitation wavelength of 450 nm.
Figure 5:
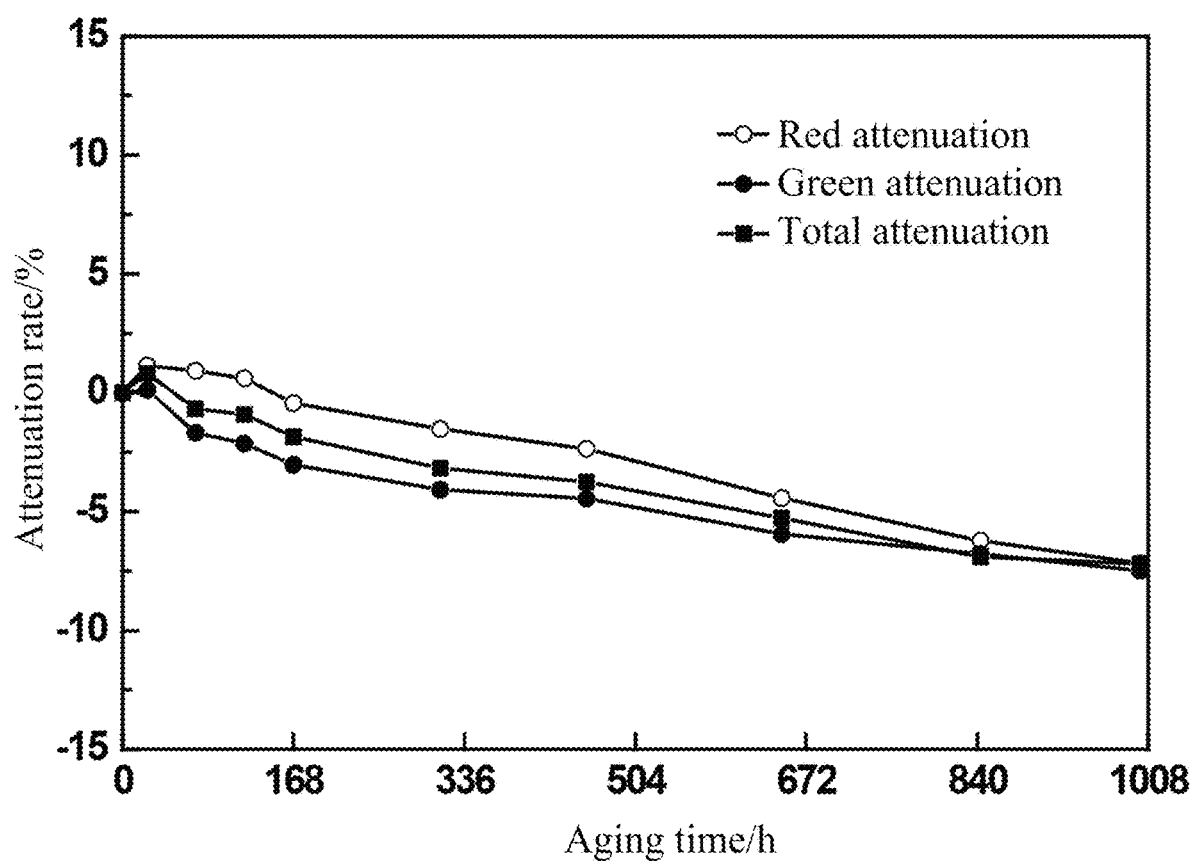
FIG. 5 shows decay curves of the QD diffuser plate in Test Example 4 of the present disclosure under strong blue light.

In this test example, a preparation method of a QD diffuser plate was provided, including the following steps: 500 g of the QD color masterbatch samples prepared in Test Example 3 was taken according to a red-to-green masterbatch ratio of 1:8, and subjected to extrusion at 230° C. in an extruder to prepare a high-concentration QD diffuser plate. A fluorescence spectrum of the diffuser plate was determined with a fluorescence spectrophotometer at an excitation wavelength of 450 nm and was shown in FIG. 4. The high-concentration QD diffuser plate was subjected to a high-temperature blue light aging test, the red light attenuation, green light attenuation, and total light attenuation of the diffuser plate were calculated with a fluorescence spectrophotometer, and attenuation curves were shown in FIG. 5. It can be seen from the attenuation curves that the high-concentration QD diffuser plate has prominent high-temperature blue light stability.

Test Example 5

Figure 6:
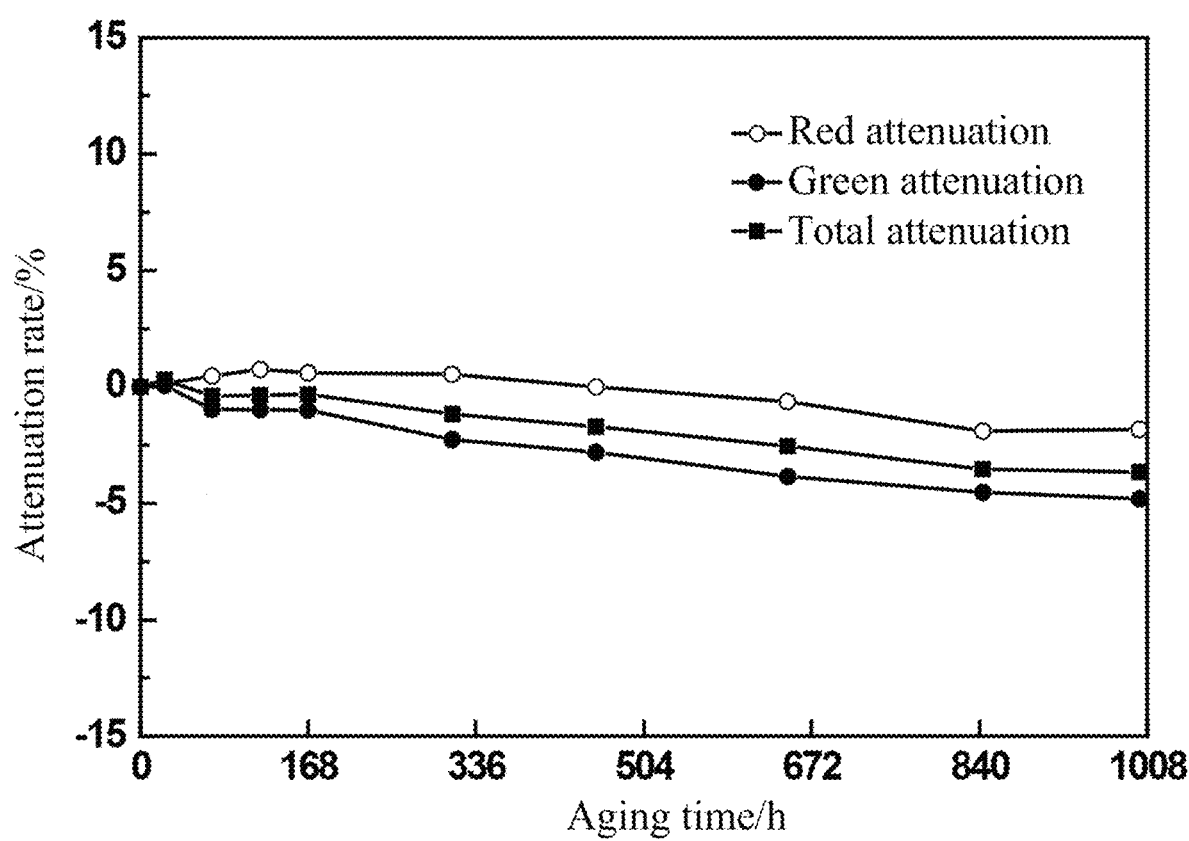
FIG. 6 shows decay curves of the QD diffuser plate in Test Example 5 of the present disclosure under strong blue light.

In this test example, a preparation method of a low-concentration QD diffuser plate was provided, including the following steps: 400 g of PMMA and 100 g of the QD color masterbatch samples prepared in Test Example 3 (a red-to-green masterbatch ratio was 1:4) were each taken, thoroughly mixed, and subjected to extrusion at 230° C. in an extruder to prepare a low-concentration QD diffuser plate. A fluorescence spectrum of the diffuser plate was determined with a fluorescence spectrophotometer at an excitation wavelength of 450 nm and was shown in FIG. 4. The low-concentration diffuser plate was subjected to a high-temperature blue light aging test, the red light attenuation, green light attenuation, and total light attenuation of the diffuser plate were calculated with a fluorescence spectrophotometer, and attenuation curves were shown in FIG. 6. It can be seen from the attenuation curves that the low-concentration QD diffuser plate has excellent high-temperature blue light stability.

Apparently, the above examples are merely listed for clear description, and are not intended to limit the implementations. Those of ordinary skill in the art may make modifications or variations in other forms based on the above description. There are no need and no way to exhaust all implementations. Obvious changes or variations made thereto shall still fall within the protection scope of the present disclosure.

What is claimed is:

1. A quantum dot (QD), wherein
the QD has a core-shell structure, and specifically has a structure of CdZnSeS/CdZnSe/CdZnS/ZnS;
there is a metal halide ligand between a CdZnS shell and a ZnS shell and outside the ZnS shell; and
the QD has an emission wavelength of 450 nm to 650 nm, a full width at half maxima (FWHM) of less than or equal to 25 nm, and a relative quantum yield (PLQY) of greater than 90%.

2. A preparation method of the QD according to claim 1, comprising the following steps:
S1: preparation of a QD core CdZnSeS:
injecting a first anion precursor into a first cation precursor comprising zinc and cadmium to obtain a first reaction solution, wherein the first cation precursor is obtained by mixing a cadmium source, a zinc source, a fatty acid, and an octadecene (ODE) and heating a resulting mixture to 140° C. to 350° C., wherein a molar ratio of cadmium to zinc is 1: (1-30); the first anion precursor is obtained by mixing a VI group element and alkylphosphine, wherein the VI group element is a mixture of sulfur and selenium and a molar ratio of the sulfur to the selenium is 1: (0.06-15); and a ratio of a total molar of the sulfur and the selenium in the first anion precursor to a total molar of the cadmium and the zinc in the first cation precursor is 1: (1-30);
S2: wrapping with a QD shell CdZnSe:
alternately adding a second cation precursor and a second anion precursor to the first reaction solution to allow a reaction to obtain a second reaction solution, wherein the second cation precursor is obtained by mixing a cadmium source, a zinc source, a fatty acid, and an ODE and heating a resulting mixture to 100° C. to 300° C., wherein a molar ratio of cadmium to zinc is 1: (0.2-50); the second anion precursor is obtained by mixing selenium and alkylphosphine; and a ratio of a molar of the selenium in the second anion precursor to a total molar of the cadmium and the zinc in the second cation precursor is 1: (0.05-30);
S3: wrapping with a QD shell CdZnS:
alternately adding the second cation precursor and a third anion precursor to the second reaction solution to allow a reaction, and adding a solution of a metal halide in alkylphosphine to further allow a reaction to obtain a third reaction solution, wherein the third anion precursor is obtained by mixing sulfur and alkylphosphine; and a ratio of a molar of the sulfur in the third anion precursor to the total molar of the cadmium and the zinc in the second cation precursor is 1: (0.05-30);
S4: wrapping with a QD shell ZnS:
adding a third cation precursor and a fourth anion precursor to the third reaction solution to allow a reaction, adding a solution of a metal halide in alkylphosphine to allow a reaction, and adding a long-chain alkanol to further allow a reaction to obtain a fourth reaction solution, wherein the third cation precursor is obtained by mixing a zinc source, a fatty acid, and an ODE and heating a resulting mixture to 100° C. to 300° C.; the fourth anion precursor is obtained by mixing a sulfur source with alkylphosphine or an ODE or a fatty acid, and has a sulfur concentration of 0.1 mmol/mL to 10 mmol/mL; a ratio of a molar of sulfur in the fourth anion precursor to a molar of zinc in the third cation precursor is 1: (0.05-30); and the solution of a metal halide in alkylphosphine has a metal halide concentration of 0.01 mmol/mL to 5 mmol/mL; and S5: precipitation and drying:

subjecting the fourth reaction solution to solid-liquid separation (SLS) obtain a precipitate, and washing and drying the precipitate to obtain the QD.

3. The preparation method according to claim 2, wherein the total molar of the cadmium and the zinc in the first cation precursor, the total molar of the cadmium and the zinc in the second cation precursor, and the molar of the zinc in the third cation precursor are in a ratio of 1:1:0.5.

4. The preparation method according to claim 3, wherein the fatty acid is one or more selected from the group consisting of oleic acid, stearic acid, dodecanoic acid, tetradecanoic acid, and hexadecanoic acid;

the alkylphosphine is tributylphosphine (TBP) or trioctylphosphine (TOP);

the cadmium source is one or more selected from the group consisting of cadmium oxide, cadmium acetate, and cadmium stearate;

the zinc source is one or more selected from the group consisting of zinc oxide, zinc acetate, and zinc stearate;

the metal halide is one selected from the group consisting of aluminum chloride, zinc chloride, magnesium chloride, cupric chloride, aluminum bromide, zinc bromide, magnesium bromide, cupric bromide, zinc iodide, and cuprous iodide;

the sulfur source is one selected from the group consisting of a sulfur powder, dodecanethiol (DDT), and octanethiol; and the long-chain alkanol is one selected from the group consisting of n-octanol, n-decanol, and dodecanol.

5. A preparation method of a QD composite, comprising the following steps:

dissolving each of the QD according to claim 1 and an organic polymer in xylene to obtain two solutions, and mixing the two solutions to obtain a mixed solution, wherein a mass ratio of the QD to the organic polymer is 1: (1-20); and adding an antioxidant to the mixed solution to allow a reaction, and after the reaction is completed, removing the solvent, and drying and crushing a resulting solid to obtain the QD composite.

6. The preparation method according to claim 5, wherein the organic polymer is one or more selected from the group consisting of an acrylic polymer, a cyclic olefin copolymer (COC), polystyrene (PS), and a styrene copolymer, and has a molecular weight of 4,000 to 90,000; and the antioxidant is one or more selected from the group consisting of pentaerythritol tetrakis [β-(3,5-di-tert-butyl-4-hydroxyphenyl) propanoate], tris(2,4-di-tert-butylphenyl) phosphite, and bis(2,4-di-tert-butylphenyl) pentaerythritol diphosphite.

* * * * *